US009550929B2

United States Patent
Schmitz-Stapela et al.

(10) Patent No.: US 9,550,929 B2
(45) Date of Patent: Jan. 24, 2017

(54) USE OF A LATENTLY REACTIVE ADHESIVE FILM FOR ADHESIVE BONDING OF ELOXATED ALUMINUM TO PLASTIC

(71) Applicant: tesa SE, Hamburg (DE)

(72) Inventors: Daniel Schmitz-Stapela, Hamburg (DE); Thilo Dollase, Hamburg (DE); Sven Reiter, Hamburg (DE); Frank Hannemann, Hamburg (DE)

(73) Assignee: tesa SE, Norderstedt (DE)

( * ) Notice: Subject to any disclaimer, the term of this patent is extended or adjusted under 35 U.S.C. 154(b) by 25 days.

(21) Appl. No.: 14/380,854

(22) PCT Filed: Feb. 22, 2013

(86) PCT No.: PCT/EP2013/053542
§ 371 (c)(1),
(2) Date: Aug. 25, 2014

(87) PCT Pub. No.: WO2013/127697
PCT Pub. Date: Sep. 6, 2013

(65) Prior Publication Data
US 2015/0017452 A1    Jan. 15, 2015

(30) Foreign Application Priority Data
Mar. 1, 2012 (DE) .................. 10 2012 203 249

(51) Int. Cl.
| | | |
|---|---|---|
| C09J 175/04 | (2006.01) |
| B32B 37/06 | (2006.01) |
| C09J 7/04 | (2006.01) |
| B32B 37/26 | (2006.01) |
| B32B 38/00 | (2006.01) |
| C09J 7/02 | (2006.01) |
| B32B 7/12 | (2006.01) |
| B32B 37/12 | (2006.01) |
| C09J 7/00 | (2006.01) |
| C08J 5/12 | (2006.01) |
| C09J 5/00 | (2006.01) |

(Continued)

(52) U.S. Cl.
CPC .............. *C09J 175/04* (2013.01); *B32B 7/12* (2013.01); *B32B 37/06* (2013.01); *B32B 37/1207* (2013.01); *B32B 37/26* (2013.01); *B32B 38/004* (2013.01); *C08J 5/12* (2013.01); *C09J 5/00* (2013.01); *C09J 7/00* (2013.01); *C09J 7/02* (2013.01); *C09J 7/0203* (2013.01); *C09J 7/0235* (2013.01); *C09J 7/043* (2013.01); *B29C 65/4835* (2013.01); *B29C 65/5057* (2013.01); *B29C 66/7422* (2013.01); *B32B 37/0046* (2013.01); *B32B 38/1841* (2013.01); *B32B 2037/1223* (2013.01); *B32B 2037/268* (2013.01); *B32B 2038/042* (2013.01); *B32B 2305/186* (2013.01); *B32B 2305/28* (2013.01); *B32B 2309/02* (2013.01); *B32B 2309/04* (2013.01); *B32B 2309/12* (2013.01); *B32B 2311/24* (2013.01); *B32B 2398/20* (2013.01); *B32B 2457/00* (2013.01); *C09J 2201/61* (2013.01); *C09J 2205/102* (2013.01); *C09J 2475/00* (2013.01); *Y10T 156/10* (2015.01); *Y10T 428/31605* (2015.04)

(58) Field of Classification Search
CPC ............ B29C 65/4835; B29C 65/5037; B29C 66/7422; B32B 2037/1223; B32B 2037/268; B32B 2308/042; B32B 2308/28; B32B 2039/02; B32B 2039/04; B32B 2039/12; B32B 2311/24; B32B 2398/20; B32B 2457/00; B32B 37/0046; B32B 37/06; B32B 37/1207; B32B 37/26; B32B 38/004; B32B 38/1841; B32B 7/12; C08J 5/12; C08J 5/121; C08J 5/124; C09J 2201/61; C09J 2205/102; C09J 2475/00; C09J 5/00; C09J 7/00; C09J 7/02; C09J 7/0203; C09J 7/0235; C09J 7/043; C09J 175/04; Y10T 156/10; Y10T 428/31605; Y10T 428/31609
USPC .... 428/425.9; 156/60, 289, 311, 295, 331.4, 156/331.7
See application file for complete search history.

(56) References Cited

U.S. PATENT DOCUMENTS 5,710,215 A * 1/1998 Abend .................. 525/124
6,025,416 A * 2/2000 Proebster et al. ........... 523/333
(Continued)

FOREIGN PATENT DOCUMENTS

| | | |
|---|---|---|
| CN | 1284973 A | 2/2001 |
| DE | 23 04 126 A1 | 8/1974 |

(Continued)

OTHER PUBLICATIONS

International Search Report dated Jun. 20, 2013, mailed Jul. 1, 2013.
(Continued)

*Primary Examiner* — Thao T Tran
(74) *Attorney, Agent, or Firm* — Norris McLaughlin & Marcus PA

(57) ABSTRACT

Adhesive bonding of eloxated aluminum to plastic, with a product having at least one layer of a latently reactive adhesive film which has a thermoplastic component having a melting point T(melting) where 35° C.≤T(melting)≤90° C. and contains functional groups that can react with isocyanate and an isocyanate-containing component dispersed in particulate form in the thermoplastic and is essentially deactivated in the region of the particle surface, the particles having a start temperature T(start) where 40° C.≤T(start) ≤100° C. and where T(start)≤T(melting).

1 Claim, No Drawings

(51) Int. Cl.
 B32B 37/00 (2006.01)
 B32B 38/18 (2006.01)
 B32B 38/04 (2006.01)
 B29C 65/48 (2006.01)
 B29C 65/50 (2006.01)
 B29C 65/00 (2006.01)

(56) References Cited

U.S. PATENT DOCUMENTS

| | | |
|---|---|---|
| 6,348,548 B1 | 2/2002 | Abend |
| 6,686,416 B2 | 2/2004 | Guse et al. |
| 7,923,510 B2 | 4/2011 | Husemann et al. |
| 2008/0166554 A1 | 7/2008 | Husemann et al. |
| 2008/0171208 A1* | 7/2008 | Buchner et al. ........... 428/423.1 |
| 2010/0032089 A1 | 2/2010 | Spies et al. |
| 2011/0111236 A1 | 5/2011 | Pahl et al. |
| 2012/0027986 A1 | 2/2012 | Husemann et al. |

FOREIGN PATENT DOCUMENTS

| | | |
|---|---|---|
| DE | 10 2004 033728 A1 | 2/2006 |
| DE | 10 2005 035905 A1 | 2/2007 |
| DE | 10 2009 006935 A1 | 8/2010 |
| DE | 10 2010 013145 A1 | 2/2011 |
| EP | 1 172 390 A1 | 1/2002 |
| EP | 1 988 111 A1 | 11/2008 |
| EP | 2 151 484 A2 | 2/2010 |
| WO | 93/25599 A1 | 12/1993 |
| WO | 99/29755 A1 | 6/1999 |

OTHER PUBLICATIONS

English Translation of International Search Report dated Jun. 20, 2013, mailed Jul. 1, 2013.
German Search Report dated Aug. 31, 2012.
English Translation of Taiwanese Office Action for corresponding Taiwanese Patent Application No. 102106189 issued Jul. 11, 2016.

* cited by examiner

USE OF A LATENTLY REACTIVE ADHESIVE FILM FOR ADHESIVE BONDING OF ELOXATED ALUMINUM TO PLASTIC

This is a 371 of PCT/EP 2013/053542 filed 22 Feb. 2013, which claims foreign priority benefit under 35 U.S.C. 119 of German patent application 10 2012 203 249.5 filed Mar. 1, 2012, the entire contents of which are incorporated herein by reference.

The invention relates to the use of a product having at least one layer of a latently reactive adhesive film which comprises a thermoplastic component, which comprises functional groups which are able to react with isocyanate, and an isocyanate-containing component, which is in particulate dispersion in the thermoplastic component and is substantially deactivated in the region of the particle surface. The invention relates further to a method for producing a sheetlike element having at least one adhesive layer and at least one temporary carrier or having at least two adhesive layers and at least one permanent carrier, with at least one adhesive layer being a latently reactive adhesive film consisting of a latently reactive formulation which comprises a thermoplastic component, which comprises functional groups which are able to react with isocyanate, and an isocyanate-containing component, which is in particulate dispersion in the thermoplastic component and is substantially deactivated in the region of the particle surface.

BACKGROUND OF THE INVENTION

In modern consumer electronics devices it is frequently necessary for various components, having in some cases only very low strut widths to be bonded to one another. In this case, the bonding strengths of pressure-sensitive adhesive tapes are often insufficient, hence making it necessary in such cases oftentimes to fall back on reactive liquid adhesives. The use of liquid adhesives, however, entails certain disadvantages, being linked as it is with considerable odor nuisance. Moreover, liquid adhesives are awkward to handle. Consequently, adhesive systems are sought that have a low vapor pressure and are available in substantially two-dimensional form for neater processing. One option is that of heat-activatable films (HAF). Since the substrates to be bonded to one another include heat-sensitive substrates, the requirement exists to offer HAF which can be processed even at very low temperatures (T<100° C.).

A type of adhesive bond for which demand has developed increasingly in recent years particularly in the electronics segment—for example, in cellphones or so-called laptops—is the adhesive bonding of eloxed aluminum and plastic. Eloxed aluminum is becoming ever more important as a decorative material for electronic devices. So-called eloxed or else anodized aluminum, i.e., aluminum processed using the Eloxal process, is aluminum on whose surface an oxidic protective layer has been formed by anodic oxidation of the aluminum. Here, in contrast to the electroplating techniques, the protective layer is not deposited on the workpiece; instead, an oxide or hydroxide is formed by conversion of the topmost layer of metal. It therefore has a particularly good connection to the aluminum. A layer 5 to 25 μm thick is formed, which protects underlying layers from corrosion for as long as no gaps are formed in this layer, as a result of mechanical damage, for example. A disadvantage of eloxed aluminum is its thermal sensitivity. Because the aluminum oxide has an expansion coefficient different from that of the aluminum itself, and is brittle, the layer of aluminum oxide, under the effect of heat even at temperatures around 100° C., develops stress cracks—in other words, the abovementioned unwanted gaps are produced in the protective layer. Thermal stressing even in this temperature range, moreover, results in visual defects, an unwanted phenomenon for decorative elements.

For the bonding strength on a substrate, it is particularly the chemical and physical surface properties that are critical in relation to the substrate. As far as the anchoring of an adhesive layer on its surface is concerned, therefore, eloxed aluminum is more like a ceramic (aluminum oxide groups and aluminum hydroxide groups) than a metal, with the specific challenges associated with the anchoring of adhesive layers on ceramic, and tends to present fewer of the challenges associated with the anchoring of adhesive layers on metals.

The hot pressing of HAF diecuts is now established practice and is known, for example, for the adhesive bonding of chip modules into chip cards. The hot adhesive bonding of polycarbonate cell phone casings to a decorative aluminum section is described in the Applicant's DE 10 2005 035 905 A1 (=U.S. Pat. No. 7,923,510). Here, pressing temperatures of 180° C. are employed. Eloxed aluminum is too heat-sensitive for bonding temperatures of 180° C., and is therefore also not explicitly stated in the specification.

The Applicant's DE 10 2009 006 935 A1(=U.S. 2012/027986) describes heat-activatable films comprising a nonwoven carrier for the bonding of metals and plastics. Among the substrates listed is anodized (eloxed) aluminum. Preference is given to using thermoplastic materials having a melting temperature of more than 85° C. Even this temperature, however, is too high for the bonding of eloxed aluminum. Thermoplastic polyurethanes are stated, though not explicitly those obtained from aqueous dispersion. Although isocyanates can be employed as reactive resins, no particular treatment of the isocyanates is stated. This reactive-resin component is also mentioned as a component for addition to the thermoplastic polyurethane; the thermoplastic matrix itself is not a reactive system.

WO 93/25599 A1 (Thomas Abend) discloses formulations for latently reactive polyurethane systems that comprise deactivated polyisocyanates, having reactivity at temperatures above 55° C., and comprising polymers which at temperatures above 40° C. are meltable and are able to react with isocyanate. These formulations may be coated onto substrates, which can then be bonded. They may also be shaped in the form of a carrier-free film, which can then be laminated to a substrate to be bonded. Adhesive systems of this kind serve for the joining, sealing, laminating, or coating of wood, plastics, metals, glass, textiles, synthetic sheetlike structures, card, paper, and foils. These materials are not defined in any more detail. There is no mention of a plastic/metal combination. Nor is there any reference to eloxed aluminum.

J. Büchner, W. Henning, *Adhäsion,* 2007, 51(6), 16-21 describes drying processes for aqueous, latently reactive polyurethane dispersions, and also pressing approaches for the adhesive bonding of two substrates. Example substrates cited are PVC, leather, and MDF (medium-density wood fiberboard). There is no mention of adhesive bonding of metal/plastic combinations, and eloxed aluminum is not recited.

DE 10 2010 013 145 A1 (Lohmann) describes adhesives which are heat-activatable and latently reactive. At room temperature they have slight tack and still exhibit adhesiveness for a certain time following initial heating and cooling. These adhesives are based preferably on polyurethanes. Substrates stated for bonding include metals and plastic, without further particularization, and is there is particular reference to the application of bonding heat-sensitive plastics in the electronics industry. A plastic/metal combination is not stated; eloxed aluminum is not mentioned.

WO 99/29755 (=U.S. Pat. No. 6,348,548) (Thomas Abend) describes reactive polyurethane adhesive systems based on aqueous polyurethane dispersions. Dispersed into the matrix of a thermoplastic polyurethane, which still carries functional groups for reaction with isocyanates, are polyisocyanate particles that are deactivated on their surface. At a first temperature, the thermoplastic polyurethane melts. At a temperature above this, the deactivated particle surface dissolves and the isocyanate groups are able to react with the functional groups of the thermoplastic polyurethane. Substrates said to be suitable for the adhesive bonding are, generally, metals, plastics, glass, wood, wood composites, card, films/foils, synthetic sheetlike structures, and textiles. The possibility of combination of materials is not stated, and nor is any reference made to eloxed aluminum.

None of the stated texts offers a solution for the adhesive bonding of eloxed aluminum to plastic. The search continues, therefore, for a suitable means of adhesive bonding of eloxed aluminum to plastic, that can be provided in substantially two-dimensional form, that can be applied to a substrate (eloxed aluminum or plastic) at a low temperature above room temperature, i.e., at a temperature even below 85° C., and that in technical terms passes the so-called push-out test after thermal pressing to the second substrate (plastic or eloxed aluminum), and achieves this not only before but also after specific humidity/heat storage. These requirements are typical for the qualification of adhesive bonds in the consumer electronics segment.

The bonding of a polar plastic (e.g., polycarbonate or PMMA) to a moisture-impermeable substrate (in the present case, eloxed aluminum) harbors special difficulties. Composite laminates of this kind are severely stressed in humidity/heat storage, since the polar plastic is able to take up a considerable quantity of moisture from the environment. This moisture presses on the adhesive film surface that is in contact with the plastics substrate. To a certain degree, the adhesive film is able to take up moisture from the plastic and emit it to the environment again. In a plastic/eloxed aluminum bond, however, this moisture is unable to escape over the full surface area, instead being able to escape only via the end faces, because the adhesive film is backed by a moisture-impermeable substrate (eloxed aluminum). The risk exists of the adhesive film detaching locally and partially from the plastics surface—an unwanted phenomenon. It may therefore be concluded that an appropriate means of adhesive bonding is an adhesive which itself has a fairly low moisture content and is not obtained from water-based dispersion, with which, in spite of drying, the possibility exists of substantial residual moisture.

It has been found, moreover, that in the case of metals and particularly for eloxed aluminum, moisture may tend to creep between the surface of the eloxed aluminum, in other words the typically 5 µm to 25 µm thick ceramic layer, and the surface of the adhesive film, possibly leading to failure of the otherwise good bonding performance. The bonding of eloxed aluminum to plastic therefore imposes a particularly exacting requirement on any bonding solution that is to be found. Bonding means suitable for the aluminum metal/plastic system cannot necessarily be employed, since the aluminum oxide of the surface layer on the eloxed aluminum has entirely different properties from the metallic aluminum, being, for example, much more brittle than the latter.

SUMMARY

Surprisingly it has been found that a product having at least one layer of a latently reactive adhesive film which comprises a thermoplastic component, which has a melting temperature T(melt) where 35° C.≤T(melt)≤90° C., more particularly 40° C.≤T(melt)≤60° C., and which comprises functional groups that are able to react with isocyanate, and an isocyanate-containing component, which is present in particulate dispersion, especially with fine division (having a particle size distribution with $d_{50}$<50 µm, more particularly <15 µm), in the thermoplastic component and is substantially deactivated in the region of the particle surface, the particles having an onset temperature T(onset) of 40° C.≤T(onset)≤100° C., more particularly 45° C.≤T(onset)≤90° C., very preferably 45° C.≤T(onset)≤75° C., and with T(onset)≥T(melt), is very suitable for adhesively bonding eloxed aluminum to plastic. After thermal pressing, the requisite bond strength of eloxed aluminum to plastic exists both before and after humidity/heat storage.

DETAILED DESCRIPTION

T(melt) here is the melting temperature of the thermoplastic component, and T(onset) is the temperature at which the isocyanate groups of the particles in dispersion in the thermoplastic component are enabled to react with the functional groups of the thermoplastic polyurethane.

Such latent reactive adhesive films are based preferably on so-called 1K latent reactive polyurethane, obtained from aqueous polyurethane dispersion, preferably Dispercoll U® from Bayer AG. The latent reactive adhesive films comprise a thermoplastic component, which has a melting temperature, T(melt) and comprises functional groups which are able to react with isocyanate, and also an isocyanate-containing component, which is in dispersion particulately, especially with fine division (preferably having a particle size distribution with $d_{50}$<50 µm, more particularly <15 µm), in the thermoplastic component and which is substantially deactivated in the region of the particle surface. The particles have an onset temperature, T(onset), for which T(melt) ≤T(onset). T(melt) is between 35° C. and 90° C., preferably between 40° C. and 60° C. T(onset) is between 40° C. and 100° C., preferably between 45° C. and 90° C., very preferably between 45° C. and 75° C. The latent reactive adhesive films are preferably nontacky at room temperature, in order to ensure good (re)positionability, as already established for other HAF systems in processing operations.

With particular preference, T(melt)<T(onset), since in this way it is possible reliably to prevent unwanted triggering of the crosslinking reaction during the production of the adhesive product in web form.

Employed with preference as thermoplastic component are compounds which are functionalized with OH and/or $NH_2$ groups. Very preferably the thermoplastic component comprises at least one semicrystalline polyester urethane.

The latently reactive adhesive film preferably comprises an anionic, high molecular mass polyurethane dispersion as thermoplastic component, having a melting temperature T(melt) with 35° C.≤T(melt)≤90° C., more particularly 40° C.≤T(melt)≤60° C., and comprising functional groups which are able to react with isocyanate—in the form, for example, of commercially available products from the aforementioned Dispercoll U family, such as Dispercoll U53 ® polyurethane dispersion, Dispercoll U54® polyurethane dispersion, Dispercoll U56® polyurethane dispersion, Dispercoll U 8755® polyurethane dispersion, Dispercoll U XP 2815® polyurethane dispersion, Dispercoll VP KA 8758, Dispercoll U XP 2682® polyurethane dispersion, Dispercoll U XP 2701, Dispercoll U XP 2702® polyurethane dispersion, Dispercoll U XP 2710® polyurethane dispersion and/or Dispercoll BL XP 2578 (Dispercoll is a registered trade mark of Bayer AG).

The latently reactive adhesive film further comprises preferably tolylene diisocyanate compounds (TDI compounds), such as Dispercoll® BL XP 2514 (TDI dimer) and/or Aqualink U (dispersion of blocked TDI dimer) and/or isophorone diisocyanates (IPDI), such as Aqualink D (dispersion of blocked IPDI trimer), as isocyanate-containing component, which is in particulate dispersion, more particularly with fine division, in the thermoplastic component and is substantially deactivated in the region of the particle surface. The diisocyanates are employed in the form, for example, of the aqueous suspension of the respective latently reactive solid isocyanate. Aqualink is available from the company Aquaspersions. Particularly in combination with anionic, high molecular mass polyurethane dispersions as thermoplastic component (such as the stated Dispercoll U products) the aforementioned diisocyanate products can be used as crosslinker component.

The latently reactive adhesive film may additionally comprise other formulating ingredients. These include thickeners, wetting agents, defoamers, fillers (e.g., thermally conducting fillers), pigments, catalysts, aging inhibitors, light stabilizers, and other polymers for establishing specific adhesive properties. Specific adhesive properties may be established, for example, by admixing aqueous dispersions of amorphous polymers (e.g., polyether urethanes or polyacrylates) and/or by admixing aqueous resin dispersions (especially based on rosin esters).

Adhesive products having at least one layer of a latently reactive adhesive film in line with the above definition, such as preferably Dispercoll U, are suitable, surprisingly, for the adhesive bonding of eloxed aluminum and plastic, despite the fact that the polyurethane base materials are obtained from aqueous dispersion and the system may therefore have additional water, which inevitably would actually work against the stability and durability of the adhesive bond.

In the case of the product of the invention, at least one layer of a latently reactive adhesive film is employed, having a layer thickness of between at least 10 µm and at most 500 µm, preferably between at least 20 µm and at most 250 µm.

The products of the invention are double-sidedly adhesive products. Products of this kind comprising at least one latently reactive adhesive film are employed most simply in single-layer form, applied on a redetachable (temporary) carrier material. Appropriate temporary carrier materials are all release foils and release papers which are known from the prior art and are furnished on one or both sides with a release layer. Siliconized papers are preferred. Papers may also be coated on one or both sides with polyethylene or polypropylene. It is also possible for two plies of a redetachable carrier material to be employed, with both the face and the reverse of the adhesive film being lined, even if the product is not in a wound form.

Products comprising at least one latently reactive adhesive film may also comprise a further carrier material, which remains in the product even after bonding (permanent carrier). Appropriate for this purpose are likewise foils and papers, but also scrims, woven fabrics and knits. The surfaces of these carrier materials may in each case independently of one another have been pretreated chemically (primer, plasma) and/or physically (corona, flame, plasma) so as to enable particularly effective anchoring of the latently reactive adhesive film on the carrier material. Nonwovens are preferred. A permanent carrier ply reduces any tendency on the part of the adhesive film to be squeezed out laterally from the bondline in the melted state under pressing conditions (in this regard, see DE 10 2009 006 935 A1).

Employed as nonwoven carrier web in this preferred case are sheetlike structures composed of individual fibers. In this context it is possible to use all of the nonwoven webs defined according to the DIN EN 29092 standard. The nonwoven web consists of loosely colaid fibers, which are still not joined to one another. The strength results from the inherent fiber adhesion. A distinction is also made between consolidated and nonconsolidated nonwovens. The fibers are distributed statistically. The nonwovens can be differentiated by the fiber materials. Fiber materials employed may be mineral fibers, such as glass, mineral wool, or basalt, for example, animal fibers, such as silk or wool, for example, plant fibers, such as cotton, for example, cellulose, chemical fibers, such as polyamide, polypropylene, polyphenylene sulfide, polyacrylonitrile, polyimide, polytetrafluoroethylene, aramid, or polyester, for example, or mixtures of the aforesaid substances. The fibers may be consolidated mechanically be needling or water jets, chemically by addition of binders, or thermally by softening in a suitable gas stream, between heated rolls, or else in a stream of steam.

In one very preferred embodiment of the invention, cellulose-based nonwovens are used. The basis weight of the nonwovens is preferably between 4 and 100 g/m$^2$, more preferably between 10 and 70 g/m$^2$. Such nonwovens are available commercially, for example, from the company Glatfelter. The thickness of these nonwovens is preferably between 20 and 100 µm, very preferably between 30 and 60 µm.

Adhesive products with permanent carriers may bear latently reactive adhesive film layers of different thickness and/or preferably, latently reactive adhesive film layers of different kind on the face and the reverse. Where different latently reactive adhesive film layers are employed, both of them meet the latently reactive adhesive film requirements as set out above. With systems of this kind it is also possible for one of the adhesive layers not to be latently reactive, but instead to be, for example, thermoplastic, heat-activatable and/or tacky.

Products comprising at least one latently reactive adhesive film may also be employed in a two-layer or multilayer form without permanent carrier. With preference, the topmost and, very preferably, the bottommost layer as well are each a layer of latently reactive adhesive film, it being possible for these films to differ in respect of thickness and/or type. Where different latently reactive adhesive film layers are employed, both of them meet the reactively latent adhesive film requirements as set out above. With systems of this kind the possibility also exists for one of the adhesive layers—outer adhesive layers, for example—to not be latently reactive, but instead, for example, to be thermoplastic, heat-activatable and/or tacky.

Multilayer adhesive products comprising permanent carriers may have thicknesses of 50 µm to 1000 µm, preferably of 75 µm to 300 µm.

The product may be converted in web form as roll product, as sheet product, or as diecuts. The latently reactive adhesive films are preferably nontacky at room temperature, since the material can then be converted very advantageously even without a temporary carrier (e.g., diecut) and provided for the further-processing operation. A tacky embodiment, however, is also conceivable and advantageous.

Processes for preparing the formulations for latently reactive adhesive films are described in WO 99/29755 A1 or in EP 1 172 390 A1, for example. A difficulty which exists is that the drying conditions for the aqueous dispersion must be selected such that the latently reactive adhesive system does not exhibit onset under these circumstances. For further details and a proposed solution, see *Adhäsion*, 2007, 51(6), 16-21. One possibility for producing the latently reactive adhesive films is the application, as described in WO 99/29755 A1, of the aqueous dispersion to a temporary or permanent carrier. This application takes place conventionally using doctor blades or nozzles. It is followed by drying. The latter may take place in a forced circulation system or in a drying tunnel. Particularly advantageous, and not described in this specification, is the technique known as suspension drying, in which the sheets are run meanderingly around rods arranged with an offset one above another in two rows, thereby achieving effective space utilization in drying in conjunction with a high dryer residence time and nevertheless a high coating speed. A more detailed description of suspension drying can be found in EP 2151484 A1 (=US 2010/032089 A). The coating temperature is, advantageously, room temperature. The drying temperature advantageously does not exceed T(melt). Just 45° C. are sufficient for adequate drying of an aqueous dispersion, provided adequate change of air in the drying operation and adequate drying-assembly residence time is ensured.

Where a permanent carrier in the form of a woven fabric, scrim or knit, more particularly in the form of a nonwoven, is employed, the permanent carrier material is laminated on, after the coating operation, to the latently reactive adhesive film, consisting of adhesive layer and temporary carrier. The operation is carried out with heat at a temperature below the onset temperature of the reactive system, and advantageously at or above the melting temperature of the thermoplastic material. It may therefore be necessary to heat the latently reactive adhesive film prior to the laminating operation. This may be done, for example using IR sources or heating rolls. Where a carrier nonwoven is used, the choice of the temperature and of the laminating pressure may be used to vary the depth of penetration into the carrier nonwoven.

Where a permanent carrier is used, it is necessary to provide the second side of the carrier as well with an adhesive layer in order to give a double-sidedly adhesive product. Coating on the opposite side of the carrier material takes place in a second step. The procedure for this may resemble that of the coating in the first step, with the first coat, consisting of temporary carrier, latently reactive adhesive film, and permanent carrier, then being laminated onto the second coat with heating. Alternatively, the second coat of the latently reactive adhesive film may take place directly onto the other side of the permanent carrier of the first coat. Again, the depth of penetration in the carrier nonwoven, where used, may be varied by means of the temperature and the laminating pressure. The rules which apply here are the same as those employed for the first lamination.

The formulation used for the second adhesive layer may be the same as that used for the first adhesive layer. It is also possible to use a different latently reactive adhesive system or else to employ a pressure-sensitive adhesive. The appropriate adhesive may be selected in dependence on the substrate to be bonded.

At its most simple, the product of the invention is constructed from an adhesive layer with a temporary carrier. If a permanent carrier is employed, at least two adhesive layers are required. In addition to this simplest construction, any other combinations with additional adhesive layers and/or carrier layers are conceivable. In particular, each of the adhesive layers may be protected with a temporary carrier for transport up until the processing stage.

The inventive use concerns the adhesive bonding of an eloxed aluminum to a plastic. The eloxed aluminum may be compacted, uncompacted and/or colored. One example of an eloxed aluminum is E6EV1. For components of consumer electronics, the plastics parts are based preferably on plastics which can be processed by injection molding. This group accordingly embraces, for example, ABS, PC, ABS/PC blends, PMMA, polyamides, glass fiber-reinforced polyamides, polyvinyl chloride, polyvinylene fluoride, cellulose acetate, cycloolefin copolymers, liquid-crystal polymers (LCP), polylactide, polyether ketones, polyetherimide, polyethersulfone, polymethacryloylmethylimide, polymethylpentene, polyphenylether, polyphenylene sulfide, polyphthalamide, polyurethanes, polyvinyl acetate, styrene acrylonitrile copolymers, polyacrylates and polymethacrylates, polyoxymethylene, acrylic ester styrene-acrylonitrile copolymers, polyethylene, polystyrene, polypropylene, or polyesters (e.g., PBT, PET). The list makes no claim to completeness. The components may take on any, arbitrary form needed for the production of a component or casing for consumer electronics articles. In the simplest form, they are planar. Furthermore, however, 3-dimensional components as well are entirely customary. The components may assume any of a very wide variety of functions, as casings, windows, or reinforcing elements, for example. With great preference the plastics used are polycarbonate PMMA, or ABS.

The invention accordingly further provides a laminate consisting of
- an eloxed aluminum element,
- a double-sided adhesive product having at least one layer of a latently reactive adhesive film which comprises a thermoplastic component, which has a melting temperature T(melt) where 35° C.≤T(melt)≤90° C., more particularly 40° C.≤T(melt)≤60° C., and which comprises functional groups that are able to react with isocyanate, and an isocyanate-containing component, which is present in particulate dispersion, especially with fine division, in the thermoplastic component and is substantially deactivated in the region of the particle surface, the particles having an onset temperature T(onset) of 40° C.≤T(onset)≤100° C., in particular 45° C.≤T(onset)≤90° C., more preferably 45° C.≤T(onset) ≤75° C., and with T(onset)≥T(melt), and
- a plastics substrate.

The plastics parts may have been painted or otherwise coated. Paints used for the surface functionalization/modification of plastics are, for example, antireflection coatings, antifingerprint coatings, antiscratch coatings, or decorative prints (known as backprints). Furthermore, plastics may also have been furnished with (inorganic) layers, such as conductive layers. One particular such conductive layer is indium tin oxide. These paints and layers are in some cases heat-sensitive and consequently themselves already necessitate the use of adhesive products which can be processed at low temperature.

For application—by way of example—in consumer electronics articles, the adhesive products with at least one layer of a latently reactive adhesive film are customarily further-processed into diecuts. These diecuts are produced either by a laser cutting process, by flatbed diecutting, or by rotary diecutting. The diecut customarily has the dimensions of the eloxed aluminum part, but may also be somewhat smaller, in order to permit slight squeezeout during the adhesive bonding operation.

At its most simple, the diecut of the adhesive product with at least one layer of a latently reactive adhesive film is positioned manually without temporary carriers, using pincers, for example, on the eloxed aluminum part or between the components to be assembled.

In a further version, the diecut of the adhesive product having at least one layer of a latently reactive adhesive film, after positioning on the eloxed aluminum, is treated with a heat source, thereby raising the adhesion of the diecut to the eloxed aluminum. In the simplest case, the heat source used may be an IR source, an iron, or a hot plate. For this operation it is advantageous if the diecut is further furnished with a temporary carrier material, in order to prevent the adhesive film sticking to the tooling and/or to the heat source.

In a further advantageous embodiment, the eloxed aluminum part is placed onto the diecut of the adhesive product having at least one layer of a latently reactive adhesive film. Placing takes place on the open side. Still located on the reverse is the temporary carrier material. A heat source is then used to introduce heat through the eloxed aluminum into the adhesive product having at least one layer of a latently reactive adhesive film. This makes the adhesive product tacky, i.e., sticky, and it adheres more strongly to the eloxed aluminum than to the temporary carrier. Heating takes place through the eloxed aluminum.

One preferred version uses a heating press to introduce the heat. The ram of the heating press in this case is manufactured from aluminum, brass, or bronze, for example, and is adapted in its shaping, in general, to the contours of the metal part and/or to the dimensions of the diecut. In order to ensure precise positioning of the diecut on the eloxed aluminum part, shaping parts are generally employed that are matched to the contours of the components to be bonded, thereby preventing slippage. Guide pins in the shaping part and corresponding guide holes in the temporary carrier material of the adhesive product having at least one layer of a latently reactive adhesive film can be used to ensure the precise positioning between diecut and eloxed aluminum part. Other positioning options are conceivable. Following heat activation, the eloxed aluminum part with the laminated-on adhesive product having at least one layer of a latently reactive adhesive film is removed from the shaping part. The entire operation may also be transferred into an automatic process.

The invention therefore also provides a method for adhesively bonding an eloxed aluminum part to a plastics part, comprising the following steps:
a) fixing the plastics component on a shaping component;
b) placing the eloxed aluminum part to be bonded, with a double-sided adhesive product having at least one layer of a latently reactive adhesive film which comprises a thermoplastic component, which has a melting temperature T(melt) where $35°\ C.\leq T(melt)\leq 90°\ C.$, more particularly $40°\ C.\leq T(melt)\leq 60°\ C.$, and which comprises functional groups that are able to react with isocyanate, and an isocyanate-containing component, which is present in particulate dispersion, especially with fine division, in the thermoplastic component and is substantially deactivated in the region of the particle surface, the particles having an onset temperature T(onset) of $40°\ C.\leq T(onset)\leq 100°\ C.$, more particularly $45°\ C.\leq T(onset)\leq 90°\ C.$, more preferably $45°\ C.\leq T(onset)\leq 75°\ C.$, and with $T(onset)\geq T(melt)$, on the plastics component;
c) applying pressure and temperature, in particular by means of a heating press ram;
d) removing the bonded components from the shaping component,
it being possible alternatively for cooling as well to be carried out between step c) and step d).

In step c), pressure and temperature are applied. This is done through a heating ram which consists of a material possessing good thermal conductivity. Examples of advantageous materials include copper, brass, bronze, and aluminum. However, other metals or alloys too may be employed. Moreover, the heating press ram ought preferably to take on the shape of the top face of the metal part. This shape may in turn be a 2-dimensional or 3-dimensional shape. The pressure is advantageously applied via a pneumatic cylinder. Its application need not, however, necessarily take place by way of air pressure. Also possible, for example, are hydraulic pressing devices or electromechanical adjusters operating via spindles, for example. It may be advantageous, furthermore, to introduce pressure and temperature a number of times, in order to increase the operational throughput by serialization or the principle of rotation, for example. In this case, the heating press rams need not all be operated with the same temperature and/or the same pressure. Furthermore, the selected contact times of the rams may also be made different.

With regard to the stated test methods:

Push-Out Test:

The push-out test provides information on the bond strength of a double-sidedly adhesive product in the direction of the adhesive-layer normal. For the test, a circular plastic substrate with diameter of 21 mm is bonded to the adhesive product under investigation on a metal frame. The metal frame has a circular hole with a diameter of 9 mm. The adhesive product likewise has a diameter of 21 mm and is punched or cut to size accordingly. The plastics substrate employed is a PC plate. The format of the metal plate exceeds the format of the plastics plate, allowing the assembly to be placed on a laydown table by means of the projecting regions of the metal plate.

Using a cylindrical ram (diameter 7 mm) clamped into a tensile testing machine, pressure is exerted on the plastics plate through the hole in the metal, and in this way a force is exerted on the bonded joint. The testing speed is 10 mm/s. The force at which the plastics substrate is detached from the metal frame is recorded. The force is based on the area of the ram, resulting in push-out strengths in units of $N/mm^2$. The adhesive product test specimen passes the measurement if the push-out strength is more than $1\ N/mm^2$. The test conditions are 23° C. and 50% relative humidity.

Humidity/Heat Storage:

For humidity/heat storage, bonded laminates are placed in a conditioning cabinet, from the company Weiss, for example, which is operated at 60° C. and 95% relative atmospheric humidity. The storage time is 72 hours.

Plastic/eloxed aluminum laminates meet the stated objective as follows:

| | |
|---|---|
| Adhesive bonding temperature, T(onset) | ≤100° C., preferably ≤90° C., more preferably ≤75° C. |
| Push-out test (fresh) | >1N/mm² |
| Push-out test after 1 week 60° C./95% rel. humidity | >1N/mm² |

EXAMPLES

Example 1

A latently reactive adhesive film was produced from 100 parts of Dispercoll U XP 2682, 13 parts of Dispercoll BL XP 2514, and 1.5 parts of Borchigel 0625. The formulating ingredients were mixed as an aqueous dispersion in a glass beaker with an anchor stirrer at 60 1/min over a period of 15 minutes at room temperature. The solids content was adjusted to 46 wt % by addition of demineralized water.

A laboratory coating table with a doctor blade was used to produce a coating on double-sidedly polyethylene-coated and siliconized paper. Resulting swatch specimens were first left to air at room temperature for 30 minutes and then dried in a forced-air drying cabinet at 45° C. for 20 minutes. The specimens had a layer thickness of 100 μm.

Using a diecutting iron, circular adhesive-tape diecuts with a diameter of 21 mm were produced from the single-layer adhesive film. One diecut in each case was placed between a plastic (polycarbonate) disk and an eloxed aluminum (E6EV1) substrate and this assembly was pressed in a laboratory heating press at a ram temperature of 80° C. and at 3 bar for 120 seconds.

The push-out test gave 2.6 N/mm$^2$ for the fresh specimen and 1.1 N/mm$^2$ for the specimen stored at 60° C. and 95% humidity.

Example 2

A latently reactive adhesive film was produced from 100 parts of Dispercoll U XP 2702, 11 parts of Dispercoll BL XP 2514, and 1.5 parts of Borchigel 0625. The formulating ingredients were mixed as an aqueous dispersion in a glass beaker with an anchor stirrer at 60 1/min (60 revolutions per minute) over a period of 15 minutes at room temperature. The solids content was adjusted to 46 wt % by addition of demineralized water.

A laboratory coating table with a doctor blade was used to produce a coating on double-sidedly polyethylene-coated and siliconized paper. Resulting swatch specimens were first left to air at room temperature for 30 minutes and then dried in a forced-air drying cabinet at 45° C. for 20 minutes. The specimens had a layer thickness of 100 μm.

Using a diecutting iron, circular adhesive-tape diecuts with a diameter of 21 mm were produced from the single-layer adhesive film. One diecut in each case was placed between a plastic (polycarbonate) disk and an eloxed aluminum (E6EV1) substrate and this assembly was pressed in a laboratory heating press at a ram temperature of 90° C. and at 3 bar for 120 seconds.

The push-out test gave 2.2 N/mm$^2$ for the fresh specimen and 1.9 N/mm$^2$ for the specimen stored at 60° C. and 95% humidity.

Example 3

A latently reactive adhesive film was produced from 100 parts of Dispercoll U 56, 20 parts of Aqualink D, and 1.5 parts of Borchigel 0625. The formulating ingredients were mixed as an aqueous dispersion in a glass beaker with an anchor stirrer at 60 1/min over a period of 15 minutes at room temperature. The solids content was adjusted to 46 wt % by addition of demineralized water.

A laboratory coating table with a doctor blade was used to produce a coating on double-sidedly polyethylene-coated and siliconized paper. Resulting swatch specimens were first left to air at room temperature for 30 minutes and then dried in a forced-air drying cabinet at 45° C. for 20 minutes. The specimens had a layer thickness of 100 μm.

Using a diecutting iron, circular adhesive-tape diecuts with a diameter of 21 mm were produced from the single-layer adhesive film. One diecut in each case was placed between a plastic (polycarbonate) disk and an eloxed aluminum (E6EV1) substrate and this assembly was pressed in a laboratory heating press at a ram temperature of 90° C. and at 3 bar for 240 seconds.

The push-out test gave 1.9 N/mm$^2$ for the fresh specimen and 1.5 N/mm$^2$ for the specimen stored at 60° C. and 95% humidity.

The invention claimed is:

1. A laminate consisting of
   an eloxed aluminum element,
   a double-sided adhesive product having at least one layer of a latently reactive adhesive film which comprises a thermoplastic component, which has a melting temperature T(melt) of 35° C.≤T(melt)≤90° C., and which comprises functional groups that are able to react with isocyanate, and an isocyanate-containing component, which is present in particulate dispersion in the thermoplastic component and is substantially deactivated in the region of the particle surface, the particles having an onset temperature T(onset) of 40° C.≤T(onset)≤100° C., and wherein T(onset)≥T(melt), and
   a plastic substrate.

* * * * *